United States Patent [19]

Herbst et al.

[11] Patent Number: 5,073,349

[45] Date of Patent: Dec. 17, 1991

[54] HIGH EFFICIENCY CATALYTIC CRACKING STRIPPING APPARATUS

[75] Inventors: Joseph A. Herbst, Turnersville, N.J.; Catherine L. Markham, Thornton, Pa.; Ajit V. Sapre, W. Berlin, N.J.; Gerald J. Teitman, Vienna, Va.

[73] Assignee: Mobil Oil Corporation, Fairfax, Va.

[21] Appl. No.: 565,005

[22] Filed: Aug. 9, 1990

Related U.S. Application Data

[62] Division of Ser. No. 454,472, Dec. 21, 1989, Pat. No. 4,968,403.

[51] Int. Cl.$^5$ .............................. F27B 15/14; B01J 8/24
[52] U.S. Cl. ...................................... 422/144; 422/146; 422/147
[58] Field of Search ................. 422/143, 144, 146, 147

[56] References Cited

U.S. PATENT DOCUMENTS

| | | | |
|---|---|---|---|
| 3,503,865 | 3/1970 | Stone | 208/10 |
| 4,144,189 | 3/1979 | Kirkbride | 252/414 |
| 4,279,722 | 7/1981 | Kirkbride | 204/162 |
| 4,545,879 | 10/1985 | Wan et al. | 204/158 |

*Primary Examiner*—Robert J. Warden
*Assistant Examiner*—Amalia Santiago
*Attorney, Agent, or Firm*—A. J. McKillop; C. J. Speciale; Richard D. Stone

[57] ABSTRACT

A catalytic cracking process operates with enhanced stripper efficiency by subjecting spent catalyst to microwave radiation before catalyst regeneration. Preferably the microwave frequency is one which ignores the catalytic cracking catalyst and preferentially excites the hydrocarbon or coke on the spent catalyst, the stripping steam conventionally used, or both the stripping steam and the hydrocarbonaceous coke. In preferred embodiments, microwave frequencies are used which are selective for various impurities in the coke, such as sulfur and/or nitrogen impurities. Additives, such as ferrous materials, may be added to augment the efficiency of desulfurization during stripping. The process is applicable to fluidized catalytic cracking and moving bed catalytic cracking units.

9 Claims, 3 Drawing Sheets

HIGH EFFICIENCY CATALYTIC CRACKING STRIPPING APPARATUS

This is a division of copending application Ser. No. 454,472, filed Dec. 21, 1989 U.S. Pat. No. 4,968,403, issued Nov. 6, 1990.

FIELD OF THE INVENTION

This invention relates to catalytic cracking of heavy hydrocarbon oils to produce liquid hydrocarbons boiling in the gasoline and distillate range. Microwave energy is used to aid in stripping of spent cracking catalyst.

BACKGROUND OF THE INVENTION

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for the purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain a desired reactor temperature. In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1-5 wt. % of the hydrocarbon feed. Hot catalyst from the regenerator is contacted with preheated (150°-375° C.) charge stock. The catalyst vaporizes and heats the feed to the desired cracking temperature. During the upward passage of the catalyst and feed, the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractioned into a series of products, including gas, gasoline, light gas oil, and heavy cycle gas oil. Some heavier than gasoline cycle oils may be recycled to the reactor. The bottoms product, a "slurry oil", may be allowed to settle. The catalyst rich solids portion of the settled product may then be recycled to the reactor. The clarified slurry oil is a heavy product.

The "reactor vessel" into which the riser discharges primarily separates catalyst from cracked products, and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537, 4,118,337, 4,118,338, 4,218,306 (Gross et al); 4,444,722 (Owen); 4,459,203 (Beech et al); 4,639,308 (Lee); 4,675,099, 4,681,743 (Skraba) as well as in Venuto et al, Fluid Catalytic Cracking With Zeolite Catalysts, Marcel Dekker, Inc. (1979). The entire contents of these patents and publication are incorporated herein by reference.

Conventional FCC catalysts are usually finely divided acidic zeolites, preferably low coke-producing, high silica zeolite cracking catalysts comprising faujasite, rare earth Y (REY), dealuminized Y (DEALY), Ultrastable Y (USY), RE-USY, Ultrahydrophobic Y (UHP-Y) and other large pore zeolites.

Typically, FCC catalysts are fine particles having an average particle diameter of 20 to 100 microns, usually around 60–80 microns.

Catalyst for use in moving bed catalytic cracking units (TCC units) can be in the form of spheres, pills, beads, or extrudates, and can have a diameter ranging from 1 to 6 mm.

Although the catalytic cracking process is highly efficient, and is the preferred process in many refineries for converting heavier hydrocarbons to lighter, more valuable products, there are still some areas where improvements are needed.

Catalyst stripping is one of these areas. After the catalytic cracking reaction is completed, the catalyst must be stripped of strippable hydrocarbons before being regenerated. The goal of this stripping operation is to remove all strippable materials, leaving only coke.

In many catalytic cracking units, especially fluidized catalytic cracking units, much of the so called "coke" is actually valuable hydrocarbon product which is entrained, adsorbed, or otherwise present on the spent catalyst. The same thing is true in moving bed catalytic cracking.

Many attempts have been made to improve the efficiency of catalyst stripping. There is strong incentive for such improvements, because better stripping will reduce emissions of sulfur and nitrogen compounds from the regenerator, increase the recovery of valuable hydrocarbon product, unload the regenerator and reduce the amount of water of combustion formed in the regenerator. Each of these aspects will be discussed below.

Sulfur and nitrogen emissions are limiting factors in many refineries. By this, it is meant that the refinery is operating at the upper limit permitted by local regulations for emissions of $SO_x$ and/or $NO_x$ from the FCC flue gas. Sulfur emissions can be most easily controlled, and most expensively, by hydrotreating the feed to remove sulfur compounds. Another alternative is running only sweet crudes, with a lower sulfur content through the catalytic cracking unit. Another approach is to add an $SO_x$ acceptor material to the unit, which releases $H_2S$ in the catalytic cracking reactor side. Yet another approach is conventional stack gas clean-up. Nitrogen oxides are a similar problem, in that they represent a stack gas pollutant. Hydrotreating, a change in FCC or TCC regenerator operation, or going to a different crude which has less nitrogen in it, are all possible methods of controlling $NO_x$ emissions. Some of these, e.g., adjusting the regenerator operation so that a more reducing atmosphere is present therein, will reduce $NO_x$ emissions but increase CO emissions.

Increased recovery of product is important because the cracked products are extremely valuable, and they should not be merely burned, as a source of fuel in the refinery. Allowing potentially strippable hydrocarbons to enter the FCC or moving bed catalyst regeneration unit is equivalent to converting a valuable fuel oil fraction into a low value coke product. This can cause "winding down" of the unit, which reduces conversion.

Water of combustion is also a severe problem in catalytic cracking regenerators, because the hydrocarbons burn to form $H_2O$ and $CO_2$. Much of the steam in the regenerator is the result of bad stripping. Steam partial pressures of 5-10 psia are a fact of life in many FCC regenerators. The $H_2O$ makes the FCC or TCC regenerator a catalyst "steamer", and this steaming leads to severe and rapid hydrothermal deactivation of the high activity, zeolite based catalyst used in these processes. The average effective life of zeolite based catalyst in many FCC units is on the order of 5-15 days. Anything that can be done to reduce the steam partial pressure in the regenerator will result in a significant increase in catalyst life.

Many catalytic cracking units are constrained solely by the capacity of the regenerator to burn off "coke" and create freshly regenerated catalyst. These units could be more efficiently run, and run at higher feed rates, if less valuable hydrocarbon were being burned in the regenerator. Ideally, the catalytic cracking regenerator should remove only catalytic coke, all other forms of coke either being removed or not created in the FCC reactor. This is the goal to which all refiners aspire, and yet in most regenerators only about $\frac{1}{3}-\frac{1}{2}$ of the material burned in the regenerator is catalytic coke.

Several attempts have been made to improve on stripping operations by increasing either stripping time or temperature. A very promising approach is that taken in U.S. Pat. No. 4,481,103, Fluidized Catalytic Cracking Process With Long Residence Time Steam Stripper, which is incorporated herein by reference. The only drawback to such an approach is that an additional vessel is required to achieve the long residence time stripping, typically 1-5 minutes. Although this approach effectively reduces the burning load on the regenerator, increases recovery of valuable products, and reduces sulfur emissions, the benefits are not quite as great as desired. There is also a slight disadvantage in that fairly long residence time of catalyst in the presence of steam is required. At the relatively low temperatures involved in U.S. Pat. No. 4,481,103, somewhat lower than the riser top temperature, there is no significant catalyst deactivation, and catalyst life is probably improved overall, rather than reduced because of the stripping operation.

Another approach is high temperature stripping. It is known to operate a stripping zone with some air or oxygen addition. The high temperature stripping, with some combustion, will be highly effective at removing potentially strippable hydrocarbons (by burning them!) and reducing the burning load in the regenerator, but there are several drawbacks. The "stripper" flue gas will be contaminated with significant amounts of nitrogen (when air is used as the oxygen containing gas), carbon monoxide, and $SO_x$. There will be enough of these materials around that the stripper effluent can no longer be mixed with the cracked products for production of more valuable hydrocarbons.

In U.S. Pat. No. 4,820,404, which is incorporated herein by reference, a preferred approach to high temperature stripping is disclosed. The spent catalyst is mixed with some hot regenerated catalyst to form a high temperature combined catalyst stream. This high temperature mixture can be very effectively stripped with stripping steam. The stripper effluent combines, as in the prior art stripping methods, with cracked vapors and the combined hydrocarbon streams are sent to conventional product recovery facilities. The stripped catalyst is then cooled and regenerated. This approach improves the efficiency of catalyst stripping, because of the higher temperatures involved, but there are some drawbacks. Operation with a stripper containing, e.g., a 50/50 mix of spent catalyst and hot regenerated catalyst requires that the stripper handle twice the catalyst flow as it did previously. There is a minor amount of hydrothermal deactivation. Some hot regenerated catalyst will see a fairly severe steaming atmosphere in the stripper. The spent catalyst will be subjected to steam stripping at a higher than normal temperature. These are minor effects. Overall this process should extend catalyst life as compared to conventional FCC units not using a hot stripper because the water precursors will be kept out of the regenerator.

A different approach, one focusing on the problem of increased $SO_x$ emissions from the FCC regenerator, is disclosed in U.S. Pat. No. 4,267,072, which is incorporated herein by reference. In this patent a metallic reactant is added to the circulating FCC catalyst inventory. The metallic reactant reacts with sulfur oxides in the regeneration zone and forms a stable metal- and sulfur containing compound. These sulfur-containing compounds are reported to break down to sulfur-containing gas which is withdrawn from the stripping zone.

We realized that none of the approaches discussed above could be completely satisfactory. The long residence time approaches were not practical for many units, which did not have the physical space to put in a long residence time stripper. High temperature stripping also requires significant unit modifications.

We realized that it was essential to make a radical departure from prior art FCC catalyst stripping procedures to achieve a significant improvement in the stripping operation.

We realized that microwave energy could be used to make catalyst stripping more efficient.

Candor compels mention of much prior work that has gone on the use of microwave energy in hydrocarbon conversion. Ever since the work reported in U.S. Pat. No. 3,503,865, which is incorporated herein by reference, researchers have known that microwave energy could be used to efficiently heat heavy, hydrocarbonaceous materials such as coal. In U.S. Pat. No. 3,503,865, coal was liquified using microwave energy.

Microwave radiation was used to enhance crystallization of zeolites in U.S. Pat. No. 4,778,666, Chu et al, which is incorporated herein by reference.

Attempts have been made to use microwave energy for in situ tar sands or heavy oil recovery projects. These uses of microwave energy have not been too successful. The material to be recovered (tar sands or heavy oil) was a relatively low value product. In-situ heating of it required that 10 tons of rock, sand, etc. has to be heated to recover 1 ton of low value material.

A much more efficient use of microwave energy for enhancement of hydrocarbon conversion processes was reported in U.S. Pat. No. 4,545,879, which is incorporated herein by reference. This patent discloses a technique for desulfurizing hydrocracked petroleum pitch containing organic molecules having chemically bound sulfur. Particles of petroleum pitch and a paraor ferro magnetic material catalyst were intimately mixed with the pitch, and the mixture subjected to microwave radiation in the presence of hydrogen to generate a high intensity oscillating electric field. This released at least part of the chemically bound sulfur from the pitch as sulfur-containing gases without substantial increase of the temperature of the pitch. Use of microwave irradiation, gated in a train of short pulses, minimized heating of the pitch.

An invitation to use microwave energy in various petroleum refinery operations is reported in U.S. Pat. No. 4,279,722, which is incorporated herein by reference. This patent suggested that the catalytic cracking operation would be improved by subjecting the feed and the cracking catalyst to microwave energy. The patentee specified that the microwave source is spaced in the riser cracker, and, ". . . where desirable, an additional source which may be of a different frequency is placed in the reactor."

U.S. Pat. No. 4,144,189, which is incorporated herein by reference, taught regenerating spent FCC catalyst in the presence of microwave energy. The spent catalyst would be fluidized with hydrogen and microwaved to convert the coke to volatile products which would be removed with the hydrogen, so that regenerated catalyst could be returned to the reactor. In an alternative embodiment, the patentee disclosed contacting the spent catalyst with a solvent then microwaving the solvent/catalyst slurry to regenerate the catalyst.

U.S. Pat. No. 4,076,607, which is incorporated herein by reference, discloses a process for coal desulfurization generating extremely low amounts of heat. The patentee taught use of microwave energy to introduce thermochemical, in-situ reactions to liberate sulfur in the form of stable gaseous species, such as $H_2S$, COS and $SO_2$.

None of the prior workers in the microwave field address the problems of improving the operation of the FCC stripper in a practical manner. Most of the microwave processes make poor use of an expensive energy source. This can be better understood by considering what goes on in an FCC.

Operation of a catalytic cracking unit using microwave energy to, e.g., activate a mixture of fresh feed and catalytic cracking catalyst would require enormous amounts of microwave energy. In FCC units there are usually 3-10 weights of catalyst per weight of oil. A large FCC unit might be a 50,000 BPD unit. The amount of energy needed to microwave 50,000 BPD of oil plus perhaps 5 times the weight of this oil in hot catalyst is enormous. The improvements expected in the catalytic cracking operation are not sufficient, it is believed, to justify such an expense.

Use of microwave energy to regenerate spent catalytic cracking catalyst could result in extremely high energy cost. Quite a lot of hydrogen would be required to gasify coke back to hydrocarbons in a hydrogen fed, microwave irradiated FCC regenerator. The catalyst resulting from such a regeneration would not be at an especially high temperature, so some other source of heat would be needed to supply the endothermic heat of the catalytic cracking reaction. Regeneration of FCC catalyst by contact with a solvent also would require an enormous expenditure of energy, and would not produce the hot regenerated catalyst necessary to supply the heat needed for the cracking reaction.

We realized that modern FCC units operate fairly efficiently in both the riser reactor and in the regenerator. By this we do not mean that all things are perfect, but that only minor improvements in the operation of the riser reactor or the FCC regenerator are all that can be hoped for in such a mature process. The only area in catalytic cracking where gross inefficiencies remain is the catalyst stripper. FCC operators have known that $\frac{1}{3}-\frac{1}{2}$ of the so called "coke" remaining on catalyst fed to the regenerator is actually the product of an inefficient stripping operation.

We have now discovered a way to profoundly improve the operation of the FCC catalyst stripper.

BRIEF SUMMARY OF THE INVENTION

Accordingly, the present invention provides in a process for the catalytic cracking of a heavy, hydrocarbonaceous feed to lighter components by contact of the feed with a source of hot regenerated catalyst to form a mixture of spent catalyst and cracked products which mixture is separated into a cracked products rich vapor phase and a spent catalyst phase, the spent catalyst is stripped in a catalyst stripper to remove strippable materials and produce stripped catalyst comprising coke and unstripped hydrocarbons, and the stripped catalyst is then regenerated with an oxygen-containing gas to produce hot regenerated catalyst which is recycled to contact fresh feed, the improvement comprising microwave radiation treatment of spent catalyst after separation of spent catalyst from cracked products and before regeneration of the catalyst.

In another embodiment the present invention provides an apparatus for the catalytic cracking of a heavy, hydrocarbonaceous feed to lighter components by contact of the feed with a source of hot regenerated catalyst to form a mixture of spent catalyst and cracked products which mixture is separated into a cracked products rich vapor phase and a spent catalyst phase, the spent catalyst is stripped in a catalyst stripper to remove strippable materials and produce stripped catalyst comprising coke and unstripped hydrocarbons, and the stripped catalyst is then regenerated with an oxygen-containing gas to produce hot regenerated catalyst which is recycled to contact fresh feed, characterized by a catalyst stripper having operatively associated therewith a means for generating microwave radiation and a means for distributing said radiation into said stripper.

DETAILED DESCRIPTION

Figure 1:
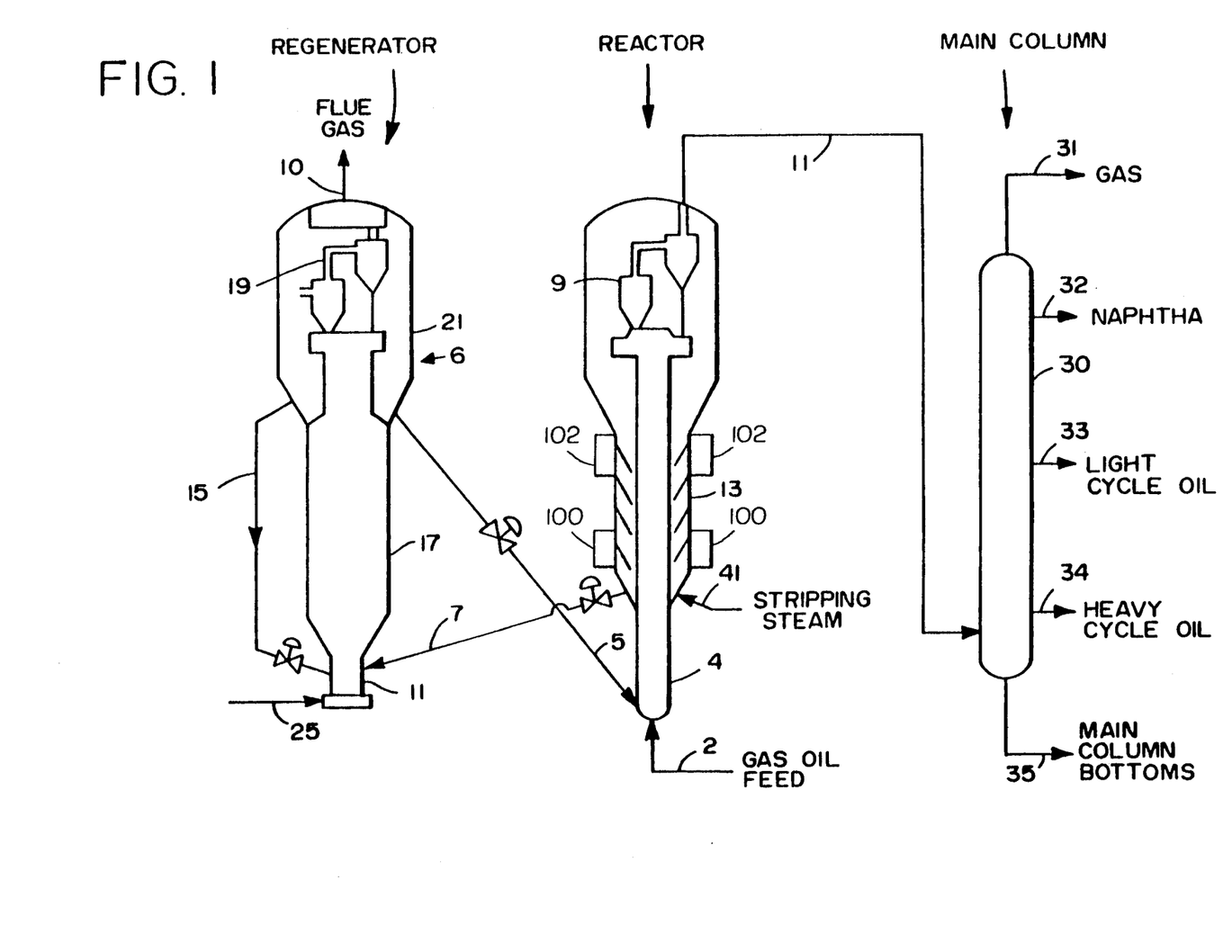
FIG. 1 is a simplified schematic view of one embodiment of the present invention, an exemplary FCC unit with a microwave heater about the catalyst stripper.

FIG. 1, is a schematic flow diagram of an exemplary FCC unit. Feed from line 2 is charged to the bottom of the riser reactor 4. Hot regenerated catalyst is added via conduit 5, equipped with a flow control valve. A lift gas may be introduced near the liquid and solid feed inlets by means not shown. The riser reactor is an elongated, cylindrical smooth-walled tube.

The feed vaporizes and forms a dilute phase suspension with the FCC catalyst. The suspension passes up the riser, which generally gets wider to accomodate volumetric expansion. Cracked products and coked catalyst may pass into a solid-vapor separation means, such as a conventional cyclone. Preferably, the riser has a deflector and short residence time stripper, as disclosed in U.S. Pat. No. 4,269,552 (Haddad and Owen) which is incorporated by reference. Another good design is the closed cyclone design disclosed in U.S. Pat. No. 4,749,471 (Kam et al) which is incorporated by reference. A means for stripping entrained hydrocarbons from the catalyst is provided in stripper 13. Preferably some conventional stripping steam is added via line 41. The microwave stripping section shown in the figure is a simple implementation of the present invention, the incorporation of multiple microwave sources 100, 102 radially disposed about the stripping section. The stripping section is preferably lined with a material which reflects the selected microwave radiation, to ensure that the microwave energy is consumed in heating up hydrocarbons, and sulfur and nitrogen compounds, and not wasted in heating up the steel stripper vessel. Multiple elevations of microwave sources are shown, to allow for some fine tuning of the process. It may be most beneficial to provide most of the microwave energy in a relatively dense phase region of the stripper, which permits a longer residence time. It may, for some crude sources, be optimum to provide more of the microwave stripping via source 102 in a higher portion of the stripper, even up into the dilute phase portion thereof, because any gas released from such portions can be promptly recovered as cracked product, and will not tend to be entrained with stripped catalyst into the regenerator.

Although the embodiment shown in the drawing will be the optimum installation in many commercial units, it should not be considered limiting. In new units, the use of a multi-stage microwave stripper, with the ability to remove stripped products at multiple points in the stripping operation, is highly preferred. With the ability to selectively heat hydrocarbons, and/or sulfur and nitrogen compounds afforded by the present invention, use of extremely short residence time stripping is now possible. Stripping techniques heretofore used to de-water paper pulp are now applicable to catalytic stripping processes. By this is meant that the catalyst, after microwaving, could be passed over relatively large cross-sectional area surfaces with a vacuum on one side of the surface to aid in stripping operation. Porous stainless steel filters can be used. In another embodiment, annular flow of catalyst around a porous stainless steel filter can be used to strip hydrocarbons and/or sulfur and nitrogen compounds from catalyst which has been microwaved.

Cracked products and stripper effluent vapors are combined and withdrawn from the reactor by conduit 12.

Stripped catalyst containing coke is withdrawn via conduit 7 and charged to conventional regenerator 6. The catalyst is regenerated by contact with an oxygen-containing gas usually air added via line 25. Flue gas is withdrawn from the regenerator by line 10. Catalyst circulates from coke combustor 17 to second dense bed 21. Some catalyst is recycled to the base 11 of coke combustor via line 15.

Conditions in the cracking reactor can be conventional. Usually the heavy feed will be preheated to about 150° C. to 375° C. The regenerator operates at about 650° C. to 750° C. and the catalyst to feed weight ratio is usually about 4:1 to 8:1, adjusted as necessary to hold a desired reactor outlet usually about 450° C. to 550° C.

Cracked product from the FCC unit passes via line 12 to main fractionator 30, where product is separated into a heavy, slurry oil stream 35, heavy cycle oil 34 light cycle oil 33 naphtha 32, and a light overhead stream 31, rich in $C_2$–$C_4$ olefins, $C_1$–$C_4$ saturates, and other light cracked gas components. This light stream is usually treated in an unsaturated gas plant to recover various light gas streams, including $C_3$–$C_4$ LPG, and optionally $C_2$- fuel gas or the like.

The improved stripper of the present invention works very well with conventional FCC units and in TCC units. The maximum benefit from the present invention will frequently be achieved when a heavy, metals containing residual feed is at least part of the feed to the catalytic cracking unit.

FEEDS

The feed can include any conventional feed for catalytic cracking units. Preferably the feed comprises a wholly or partly non-distillable fraction, e.g., 650° C.+ boiling range material.

Conventional cracking feeds, such as gas oil, vacuum gas oil, whole crudes, etc. can also be used. Because of the more efficient stripping design of the present invention, there will be excess capacity in the regenerator, so the FCC unit can tolerate significantly higher conversions, or as is more likely to be the case, significantly higher levels of heavy, non-distillable, residual feeds. Other heavy feeds which may be present include coal liquids, tar sands, shale oils, and similar heavy feeds which have a tendency to produce a lot of coke on conventional catalytic cracking catalyst.

FCC PROCESS

The fluidized catalytic cracking process, in the reactor section and regenerator section, are conventional. They will operate more efficiently, because of the improvements afforded in their operation by use of the inventive stripper design.

The FCC regenerator can be operated conventionally. Because of the significantly reduced burning load which is a by product of the better stripping operation, more catalyst can be regenerated, or more importantly, more or more refractive hydrocarbon can be cracked.

The FCC catalyst is conventional, typically a large pore zeolite in a matrix. The large-pore zeolite cracking component may be conventional. Some of these zeolites, and patents describing their preparation are discussed hereinafter. Zeolite X, zeolite Y, and higher silica forms of zeolite Y such as dealuminized Y (DEAL; U.S. Pat. No. 3,442,795; U.S. Pat. No. 4,331,694 and U.S. Pat. No. 4,401,556), ultra stable Y (US Y; U.S. Pat. No. 3,449,070), ultrahydrophobic Y (UHP Y, U.S. Pat. No. 4,401,556) and similar materials may be used herein. These materials may be subjected to conventional treatments, such as impregnation or ion exchange with rare earths to increase stability. These patents are incorporated herein by reference.

The large-pore zeolite should have a pore opening of at least about 7 angstroms. This zeolite does most of the cracking of large molecules in the feed. Preferably, conventional FCC catalyst, e.g., REY or RE-USY, in a silica-alumina-clay matrix is used.

Very large pore materials, such as VPI-5 or pillared clays such as disclosed in U.S. Pat. No. 4,742,033, which is incorporated by reference, may be used as part or all of the "large-pore" zeolite.

The catalyst may also contain other shape selective zeolites, in the same particle, or the shape selective zeolites may be in separate particles.

Any shape selective zeolite which at the conditions experienced in a catalytic cracking unit promotes formation of olefinic materials, or promotes paraffin aromatization, can be used. Any zeolite having a constraint index of 1-12 can be used herein. Details of the Constraint Index test procedures are provided in J. Catalysis 67, 218-222 (1981) and in U.S. Pat. No. 4,711,710 (Chen et al), both of which are incorporated herein by reference.

Preferred shape selective zeolites are exemplified by ZSM-5, ZSM-11, ZSM-12, ZSM-23, ZSM-35, ZSM-38, ZSM-48, ZSM-57 and similar materials.

ZSM-5 is described in U.S. Pat. No. 3,702,886, U.S. Pat. No. Re. 29,948 and in U.S. Pat. No. 4,061,724 (describing a high silica ZSM-5 as "silicalite").

ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part or all of the framework aluminum are boron and other metals which are heavier than aluminum, e.g., gallium, zirconium and titanium. Specific examples of such catalysts include ZSM-5 or zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably relatively high silica shape selective zeolites are used, i.e., with a silica/alumina ratio above 20/1, and more preferably with a ratio of 70/1, 100/1, 500/1 or even higher.

MICROWAVE AUGMENTED CATALYST STRIPPING

The present invention may be implemented using multiple modes of microwave augmented catalyst stripping. The choice as to the precise method of implementation at a given refinery will be based on many local constraints, such as size, capital constraints, and the amount of stripping and/or sulfur removal required to meet local air pollution regulations.

The frequency range of microwave energy used can range from about 600 to 50,000 MHZ, preferably about 900 to 30,000 more preferably about 900 to 3,600 MHZ and most preferably about 915 to about 2450 MHZ. The frequency chosen depends to some extent on the goal, i.e., gross heating or promotion of a selected reaction.

The different phases of implementation are discussed below.

Phase I - Hot Stripping
Phase II - Tuned Stripping - Catalyst Transparent
Phase III - Tuned Stripping - Hydrocarbon Selective
Phase IV - Tuned Stripping - S, N Selective
Phase V - Tuned Stripping With Additive

PHASE I - HOT STRIPPING

At its simplest, the present invention may simply use the microwave source as a way of heating up the catalyst to be stripped. This microwave treatment can be used in conjunction with conventional steam stripping of spent catalyst to result in a somewhat hotter stripping operation. The microwaves merely heat up the entire mixture of stripping gas and spent catalyst, either before or after a conventional stripping operation.

PHASE II - CATALYST TRANSPARENT

Preferably, the microwaves are tuned so that a selective heating is achieved, i.e., the microwave frequency chosen does not preferentially heat the conventional catalytic cracking catalyst. The common microwave sources used for household and industrial microwave ovens are tuned primarily to heat up water molecules, and such microwave frequencies do a resonably good job of heating hydrocarbons and water.

Household type microwave generators are a readily available, low cost source of microwave energy. Although they are somewhat tuned to excite water vapor molecules, they are efficient for use herein because of the conditions which exist in the catalyst stripper of fluidized catalytic cracking units. The material in the stripper is essentially all catalyst, with 1-2 wt. % coke and unstripped hydrocarbons, and a modest amount of stripping steam, perhaps up to 5 wt. % steam.

Although FCC catalysts contain quite a lot of metal, typically several wt. % rare earth metals, along with nickel, vanadium, and iron which are deposited on the catalyst due to contamination of the feed, these metal-containing catalysts are largely transparent to household microwave sources. This means that the bulk of the microwave energy can be expended on heating up stripping steam and the 1-2 parts of hydrocarbon per 100 parts of coke plus unstripped hydrocarbons, with some of the energy being spent on the stripping steam. This means that microwave treating of the catalyst stripper is at least 1, and up to 2 orders of magnitude more efficient in its use of microwave energy than e.g., microwave processing of the FCC feed.

PHASE III - HYDROCARBON SELECTIVE

Preferably, the microwave source used is one which selectively heats hydrocarbons, and heats neither equilibrium catalytic cracking catalyst nor water.

PHASE IV - TUNED FOR S, N

In a preferred implementation of the present invention, the microwave source is selected to have a frequency, or frequencies, which promote selective reactions. The microwave frequency can be selected to excite sulfur-carbon bonds and/or excite nitrogen-carbon bonds, and promote removal of sulfur and nitrogen compounds from the coke and unstripped hydrocarbons on the spent catalyst. This permits another significant increase in the efficiency of the use of the microwave energy. It is no longer necessary to heat or excite the catalyst, the bulk of the coke and unstripped hydrocarbons, nor the steam. The specific molecular bonds sought to be stripped, such as sulfur and nitrogen, are targeted by the microwave source. This will slightly reduce the amount of hydrocarbon that is burned in the regenerator, but greatly reduce SOx and/or NOx emissions.

PHASE V - ADDITIVES

It is also possible, and will be preferred in some instances, to operate with additives which have catalytic and/or physical properties which make efficacious use of a microwave energy source. A source of iron filings, having a particle size distribution compatible with that of the FCC catalyst may be used, or extremely fine particles of iron filings, in the 5-10 micron range, may be used to permit more selective heating of desired surface sites and promote the catalytic removal of a desired compound, e.g., sulfur compounds. Use of 5-10 micron particles of iron might seem to be too small to permit continued use in an FCC unit, because most catalyst particles are in the range of 20-100 microns, but particles of this size are attracted to the conventional FCC catalyst by electrostatic attraction. Only minor amounts of such materials are needed in the present invention, so their continual addition, and loss from the unit, can be tolerated in view of the enhanced sulfur removal that can be achieved with the use of such additives. The fine additives can also be recovered from downstream processing steps, and recycled to the FCC unit, if desired.

MODIFICATIONS TO FCC STRIPPER

Although most efficient operation could be achieved by completely redesigning the stripper, and providing a reduced residence time, with more stages of vapor separation, the process of the present invention can be implemented in existing FCC strippers. The microwaves can be generated at or near the FCC stripper, and directed to the stripper via conventional wave guide tubes. It will be necessary to provide ports or openings in the catalyst stripper for admission of microwave energy. Although the temperatures here are fairly high, typically 800°-950° F., the pressures are fairly low, usually ranging from atmospheric to 2-3 atmospheres.

Microwaves may be added from radially out to in, in to out, or some combination of both. Many FCC strippers have elaborate steam distribution systems for steam stripping and these may be wholly or partly replaced with a microwave distribution system.

The microwave stripper may also be implemented in the dilute phase just above the dense bed of the catalyst stripper. This is a very good place to irradiate the spent catalyst, because the vaporized hydrocarbons from the catalyst will not have to travel far to exit the stripper. This is a better place to remove the stripped hydrocarbons, than, e.g., the base of the catalyst stripper where hydrocarbons released from the bottom of the stripper may well become entrained again by incoming spent catalyst added to the top of the stripper.

The most effective implementation of the present invention will be in conjunction with a riser reactor which quickly separates catalyst from cracked products. Microwaving the spent catalyst immediately after such separation will minimize re-entrainment of stripped hydrocarbons, and permit multi-stage stripping of catalyst. This means that microwave stripping of catalyst discharged from, e.g., a riser cyclone, can be supplemented with conventional steam stripping of the catalyst in the FCC unit.

In the most efficient embodiment, a riser cyclone stripping zone, with steam stripping, is followed by a microwave stripping zone, which may or may not be followed by a conventional catalyst stripper. A microwave enhanced stripping cyclone may also be used.

MOVING BED CATALYTIC CRACKING

A microwave heating section may be added just before, just after, or coextensive with the steam stripping section now used in moving bed units.

Moving bed units are harder to modify than FCC units because there is no easy way to provide an additional, separate stripping section between the reactor and the regenerator.

EXPERIMENTAL

EXAMPLE 1

Prior Art

Figure 2:
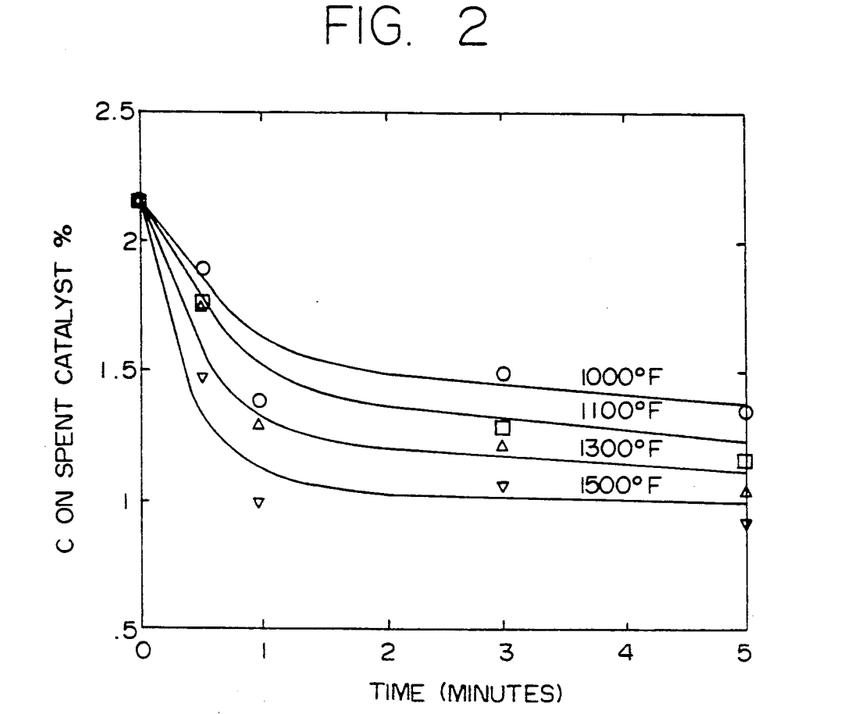
FIG. 2 shows the effect of stripping temperature/residence time on catalyst coke.
Figure 3:
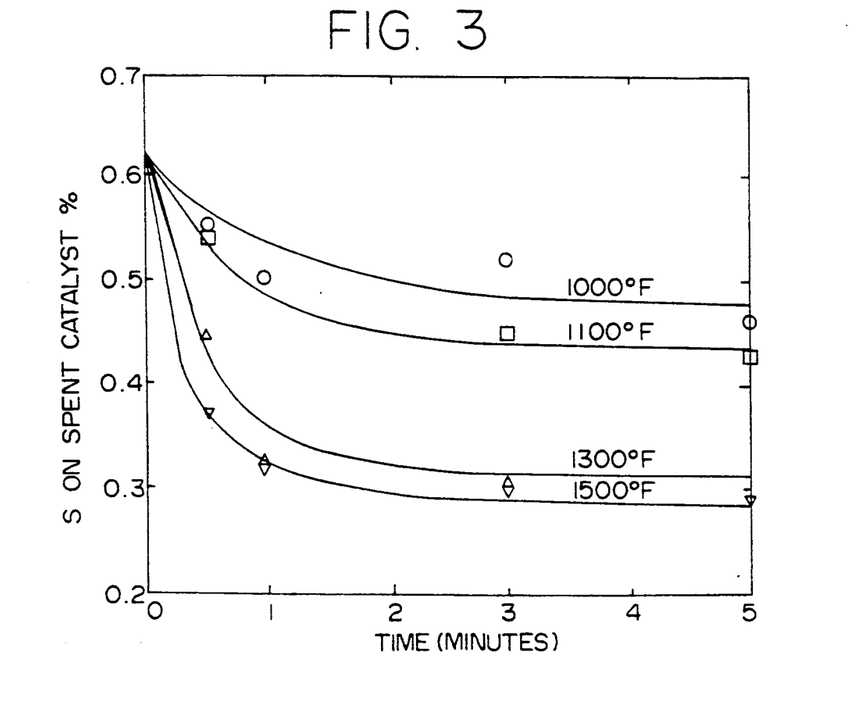
FIG. 3 shows the effect of stripping time/temperature on sulfur.

Example 1 is represented by FIGS. 2 and 3 which show the effect of time and temperature on the carbon and sulfur content in conventional catalyst stripping.

FIG. 2 shows the effect of stripping time and temperature on catalyst coke. The pilot plant unit used to generate the data did not have a microwave source, it was a conventional pilot plant stripping apparatus. The pilot plant stripper was designed to simulate to the extent possible what occurs in commercial FCC units. Obviously, commercial FCC units do not operate at the extreme temperatures reported, up to 1500° F., in FIG. 2. It is easy to achieve such temperatures in a pilot plant unit, but not practical in commerical catalytic cracking operations.

FIG. 3 is a similar plot, but this time the effect of stripping temperature/residence time on catalyst sulfur is shown. In general, an increase in either time or temperature reduces the sulfur level on the spent catalyst.

FIGS. 2 and 3 both show the importance of better stripping operation on reducing the amount of combustible material charged to a typical regenerator, and on reducing sulfur pollution generated in the regenerator. The figures also demonstrate just how much improvement is possible in conventional stripping operation. In a typical commercial unit, 15-20% of the material on the spent catalyst is actually a strippable hydrocarbon. This means that conventional FCC regenerators burn much more than they have to in order to remove catalytic coke from the catalyst.

EXAMPLE 2

INVENTION

Example 2 shows one implementation of the present invention, the Phase II implementation using a microwave source which largely ignores the conventional FCC catalyst.

A conventional FCC catalyst, GXO-41+, was used for the experiments. The physical properties are reported below.

| GXO-41+ Equilibrium Catalyst | |
|---|---|
| Surface Area, m²/g | 100 |
| Pore Volume, cc/g | .30 |
| Avg Bulk Density, g/cc | .82 |
| Particle Size | |
| 0-40 microns | 8% |
| 0-80 microns | 88% |
| Avg. Part. size | 61 |

This catalyst was a commercial equilibrium catalyst, primarily GXO-41+, and contained all the metals contamination, rare earth metals, etc., associated with commercial FCC catalysts. A commercial, equilibrium sample of FCC catalyst was used because only such samples can be truly representative of the types of catalyst to be encountered in commercial practice.

Figure 4:
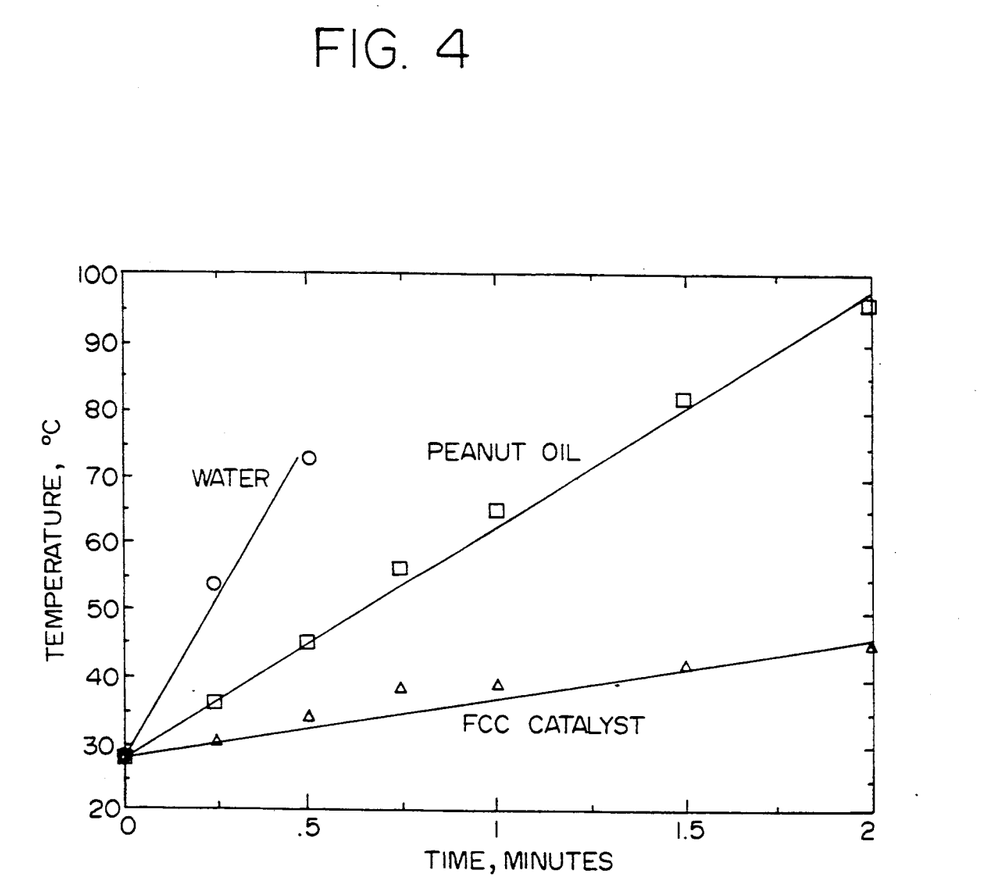
FIG. 4 shows the effect of microwave heating times on water, FCC catalyst and peanut oil.

80 cc samples of all of the materials, i.e., water, peanut oil, and equilibrium catalyst, were placed in a conventional, commercial (J. C. Penney) 500 watt microwave oven. Temperatures were measured every 15 seconds, and the results plotted, as shown in FIG. 4.

The results show that the commercial FCC equilibrium catalyst was largely ignored by the microwaves. Peanut oil, which would have heating characteristics similar to those of heavy hydrocarbons, was preferentially heated by the microwaves. Water was very efficiently heated by the microwave source, but this was to be expected as commercial microwave ovens are tuned to excite water molecules.

"WINDING-UP"

Optimizing stripper efficiency by use of microwave energy not only reduces the amount of hydrocarbon (HC) burned in the regenerator, but also lowers the regenerator temperature. This allows a refiner to 'wind-up' the unit and increase cat/oil ratios and realize the associated conversion benefits. For a given riser top temperature, catalyst circulation (and catalyst/oil ratio) is increased with improved stripping. This 'winding-up' of the unit results in increased conversion as shown below.

| Unstripped HC's/ Total Coke | Conversion to 385−°F. | Gasoline Yield |
| --- | --- | --- |
| 15% | BASE | BASE |
| 10% | +1.4 Vol % | +1.1 Vol % |
| 5% | +2.9 Vol % | +2.1 Vol % |
| 0% | +4.3 Vol % | −3.1 Vol % |

For a regenerator-limited operation, the process of the present invention also permits increased amounts of poor quality feedstocks, such as resids to be processed.

Reduction of $SO_x$ emissions from the regenerator is becoming increasingly important as environmental regulations become more stringent. Microwave stripping can significantly reduce $SO_x$ emissions.

Catalyst activity will be enhanced by the practice of the present invention, because much of the hydrogen contained in the hydrocarbons in "coke" is removed by the microwave stripping process of the present invention. This will reduce the amount of "water of combustion" formed in the FCC regenerator, and reduce catalyst steaming (and deactivation) in the regenerator.

We claim:

1. A catalytic cracking apparatus comprising
a cracking reactor means having an inlet for a source of hot regenerated cracking catalyst, an inlet for a source of a heavy hydrocarbonaceous feed, and an outlet for cracked products and spent catalyst comprising strippable hydrocarbons;
a spent catalyst and cracked product separation means connective with said reactor outlet and adapted to separate cracked products from spent catalyst comprising strippable hydrocarbons;
a spent catalyst stripping means having an inlet for spent catalyst connective with said cracked products and spent catalyst outlet of said reactor, an inlet for a stripping gas, an outlet for stripped catalyst having a reduced content of strippable hydrocarbons, and outlet for stripping gas and hydrocarbons stripped from said cracking catalyst by said stripping means;
a catalyst regeneration means adapted to produce hot regenerated catalyst by regeneration of spent catalyst with combustion gas having an inlet for stripped catalyst connective with said stripped catalyst outlet of said stripping means, an inlet for regeneration gas, an outlet for flue gas, and an outlet for resulting hot regenerated catalyst which is connective with said cracking reactor means; characterized in that
said spent catalyst stripping means comprises a means for generating microwave radiation and a means for distributing said microwave radiation into said stripper.

2. The apparatus of claim 1 wherein the means for generating radiation generates waves in the frequency range of 900 to 3,600 MHZ.

3. The apparatus of claim 1 further characterized by a catalyst stripper having operatively associated therewith a means for generating microwave radiation at at least two elevations along said stripper.

4. The apparatus of claim 3 characterized by the removal of stripped products at at least two elevations along said stripper.

5. The apparatus of claim 1 wherein the means to generate microwave radiation comprises means to provide selected microwave radiation frequencies.

6. A catalytic cracking apparatus comprising:
a cracking reactor means having an inlet for a source of hot regenerated cracking catalyst, an inlet for a source of a heavy hydrocarbonaceous feed, and an outlet for cracked products and spent catalyst comprising strippable hydrocarbons;
a spent catalyst and cracked product separation means connective with said reactor outlet and adapted to separate cracked products from spent catalyst comprising strippable hydrocarbons;
a microwave stripping means having an inlet for spent catalyst connective with said spent catalyst outlet of said reactor, an inlet for a stripping gas, an outlet for stripped catalyst having a reduced content of strippable hydrocarbons, and and outlet for stripping gas and hydrocarbons stripped from said cracking catalyst by said stripping means, said microwave stripping means having operatively associated therewith at least one means for generating and distributing microwave radiation of at least one frequency into said microwave stripping means; and:
a catalyst regeneration means adapted to produce hot regenerated catalyst by regeneration of spent catalyst with combustion gas having an inlet for stripped catalyst connective with said stripped catalyst outlet of said stripping means, an inlet for regeneration gas, an outlet for flue gas, and an outlet for resulting hot regenerated catalyst which is connective with said cracking reactor means.

7. The apparatus of claim 6 wherein said cracking reactor comprises an elongated, cylindrical smooth-walled tube.

8. The apparatus of claim 7 wherein said microwave stripping means is adapted to generate at least two frequencies of microwave radiation.

9. The apparatus of claim 7 wherein said microwave stripping means comprises multiple sources of microwave radiation at multiple elevations in said stripping means.

* * * * *